April 23, 1963 T. H. BONN ETAL 3,087,072
SIGNAL TRANSLATING DEVICE
Original Filed Sept. 24, 1953 5 Sheets-Sheet 1

INVENTORS
JOHN PRESPER ECKERT, JR.
THEODORE H. BONN
BY
[signature]
ATTORNEY

SIGNAL TRANSLATING DEVICE

Original Filed Sept. 24, 1953 5 Sheets-Sheet 2

INVENTORS
JOHN PRESPER ECKERT, JR.
THEODORE H. BONN
BY
[signature]
ATTORNEY

SIGNAL TRANSLATING DEVICE

Original Filed Sept. 24, 1953 5 Sheets-Sheet 3

INVENTORS
JOHN PRESPER ECKERT, JR.
THEODORE H. BONN
BY
Sheldon Kapustin
ATTORNEY

SIGNAL TRANSLATING DEVICE

Original Filed Sept. 24, 1953 5 Sheets-Sheet 4

INVENTORS
JOHN PRESPER ECKERT, JR.
THEODORE H. BONN
BY Sheldon Kapustin
ATTORNEY April 23, 1963 T. H. BONN ETAL 3,087,072

SIGNAL TRANSLATING DEVICE

Original Filed Sept. 24, 1953 5 Sheets-Sheet 5

INVENTORS
JOHN PRESPER ECKERT, JR.
THEODORE H. BONN

ATTORNEY

United States Patent Office 3,087,072
Patented Apr. 23, 1963

3,087,072

SIGNAL TRANSLATING DEVICE

Theodore H. Bonn, Merion Station, and John Presper Eckert, Jr., Gladwyne, Pa., assignors to Sperry Rand Corporation, New York, N.Y., a corporation of Delaware Original application Sept. 24, 1953, Ser. No. 382,180, now Patent No. 2,892,998, dated June 30, 1959. Divided and this application June 25, 1959, Ser. No. 822,954
15 Claims. (Cl. 307—88)

This application is a division of our copending application Serial Number 382,180, filed September 24, 1953, now U.S. Patent No. 2,892,998.

The invention disclosed herein relates to magnetic ampliifiers and is particularly concerned with such devices having the attributes of both a complementing magnetic amplifier and a non-complementing magnetic amplifier. As defined in the art and in this specification a complementing magnetic amplifier is one which produces an output signal when no input is applied and produces no output signal in response to each input; whereas a non-complementing amplifier produces an output only in response to an input signal. As will be explained, the magnetic amplifier described and claimed herein produces two output signals which are mutually exclusive at two different output terminals called the complement and non-complement terminals. A signal at the non-complement terminal indicates that an input has been received, whereas a signal at the complement terminal indicates that no input has been received by the amplifier.

It will be appreciated that a magnetic amplifier which is both a non-complementer and a complementer would have great utility in computing machines and the like where many of the signal translating elements must perform logical functions. For example, the device disclosed herein could be employed to control a plurality of gates; permitting one set of gates to transmit signals when the amplifier is producing outputs at its complement terminal, and permitting another set of gates to transmit signals when the amplifier is producing a signal at its non-complement terminal.

In addition to performing multiple logical functions, the instant device has all the advantages of the magnetic amplifiers disclosed in our parent application. For example, magnetic amplifiers are far more reliable and rugged than either their vacuum tube or transistor counterparts. Moreover, logical elements employing magnetic devices may be made to fit in small volumes thereby effecting a saving in size of an overall installation.

As disclosed in our parent application, amplifiers of the type utilized here, which serve as combination complementers and non-complementers, may employ ferromagnetic materials. Such materials may exhibit a hysteresis loop and in conjunction with a coil of wire display a high impedance when operating over the portion of the loop from minus residual flux density to plus residual flux density, and show a low impedance when traveling from plus residual flux density toward plus saturation flux density. Use can be made of these effects for signal translating and amplifying purposes. One way of using this effect is to produce a desired output when or while the core occupies the high impedance portion of its hysteresis loop. Further, as will be shown in this specification, a desired output may also be produced when and while the core occupies the low impedance portion of its hysteresis loop. The present invention covers a device which takes advantage of the aforedescribed effects. This device may be conveniently referred to as a serial-parallel signal translating device, or combination magnetic amplifier.

The combination magnetic amplifier of this invention, as will be described in detail in connection with FIGURE 11, comprises a core of ferromagnetic material having a coil assembly associated therewith for effecting a flux change. Connected to one of the coils in the assembly is a source of periodic power pulses producing a current in the coil assembly tending to drive the core in a first saturation region. Additionally, there is connected to the coil assembly a source of selectively applied signal pulses which tends to drive the core in the opposite saturation region. Two load elements are also coupled to the coil assembly wherein one of these elements, called the series load, is in series with the coil connected to the source of periodic power pulses, and the other load element, called the parallel load, is coupled in parallel to the same coil or across another coil associated with the core. If the core, in response to a power pulse, traverses the high impedance portion of its hysteresis loop, i.e. moves from one state of saturation to another, then an output signal will be developed across the parallel load. However, if the core, in response to a power pulse, traverses the low impedance portion of its hysteresis loop, then an output will be developed across the series load. Further, as shall be explained, the combination magnetic amplifier will yield an output synchronously with the power pulse across the parallel load (at the non-complement terminal) in response to a previously applied selective signal and will yield an output across the series load (complement terminal) synchronously with power pulses only when no selective signal has been applied.

Accordingly, it is an object of the invention to provide a new magnetic apparatus.

Another object of this invention is to provide a new magnetic amplifier producing a first output signal in response to a signal and producing a second output signal in the absence of said signal.

Another object of this invention is to provide a logical element which acts both as a complementer and non-complementer.

Another object of this invention is to provide a logical element acting both as a complementer and non-complementer which utilizes a magnetic device as a basic component.

Another object of this invention is to provide a new magnetic amplifier comprising two load elements and a source of power pulses wherein one of the load elements is connected in series with said source and the other of said load elements is effectively coupled in parallel with said source.

Another object of this invention is to provide a magnetic amplifier which is a combination complementer and non-complementer and is inexpensive to construct as well as rugged in structure.

Other objects and advantages of this invention will become apparent from the following description and the accompanying drawings, in which.

Figure 2A:
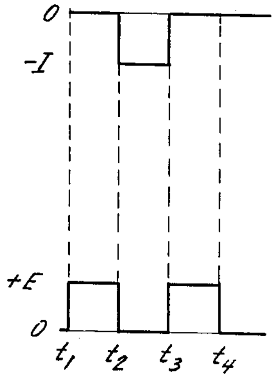
FIGURE 2 shows a basic circuit of a solid-state signal translating device.
Figure 2:
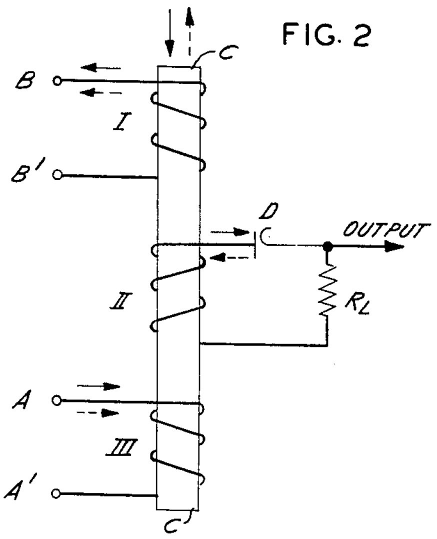
Figure 3:
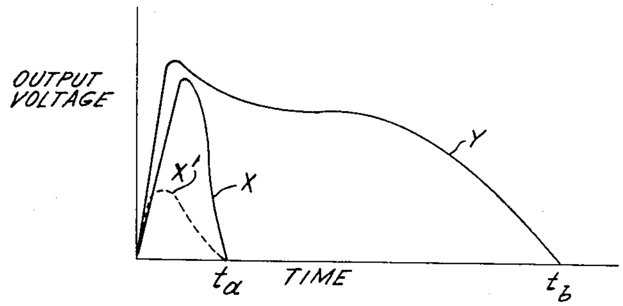
Figure 4:
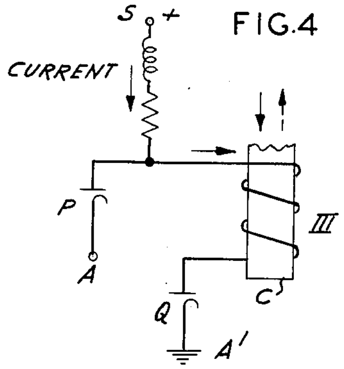
Figure 5:
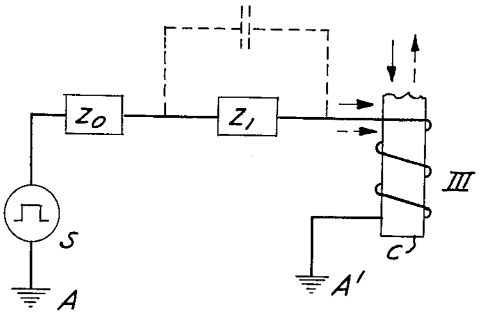
Figure 10:
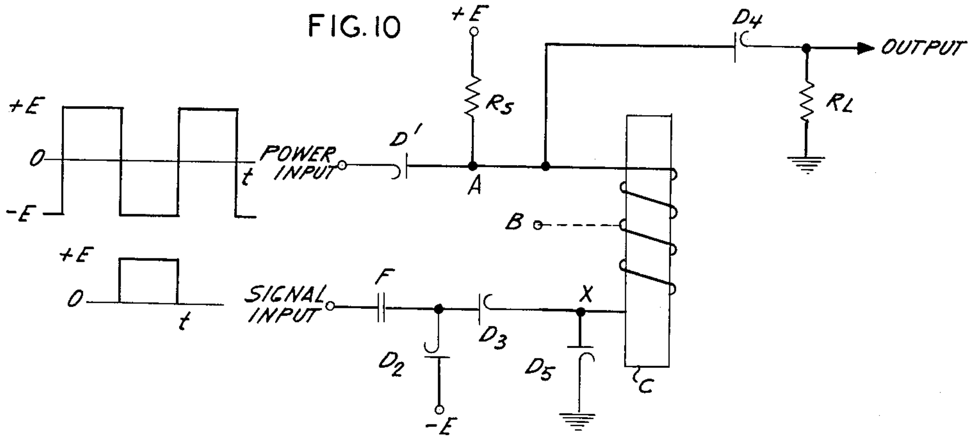
Figure 6:
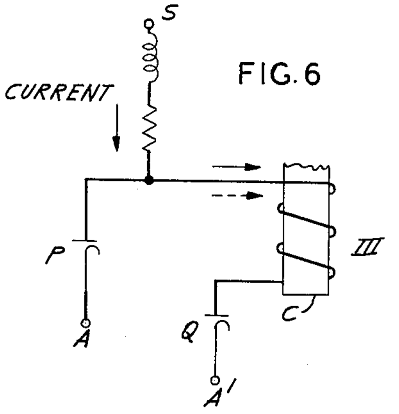
Figures 6A, 6B, 6C:
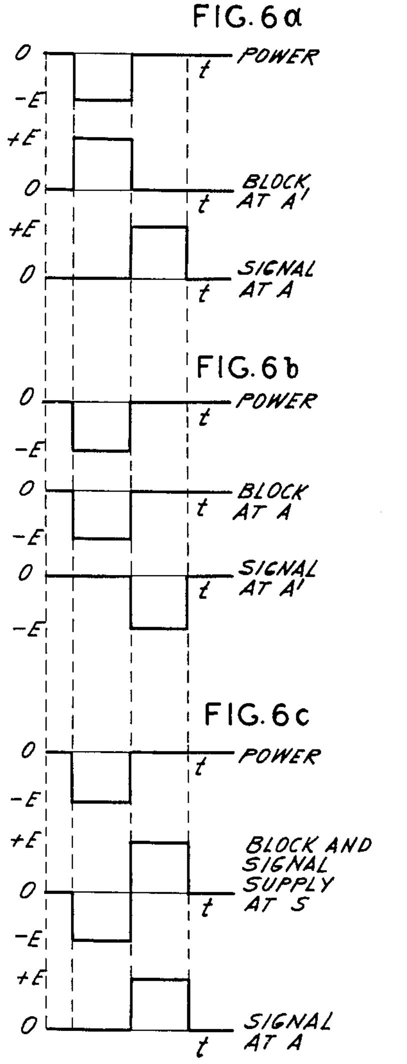
Figure 7:
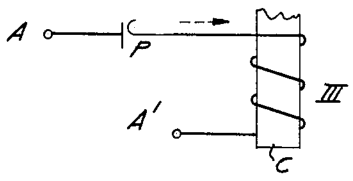
Figure 7A:
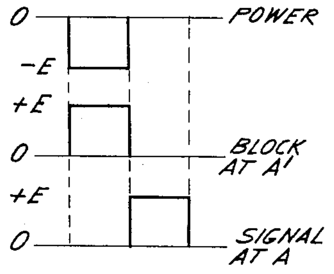
Figure 8:
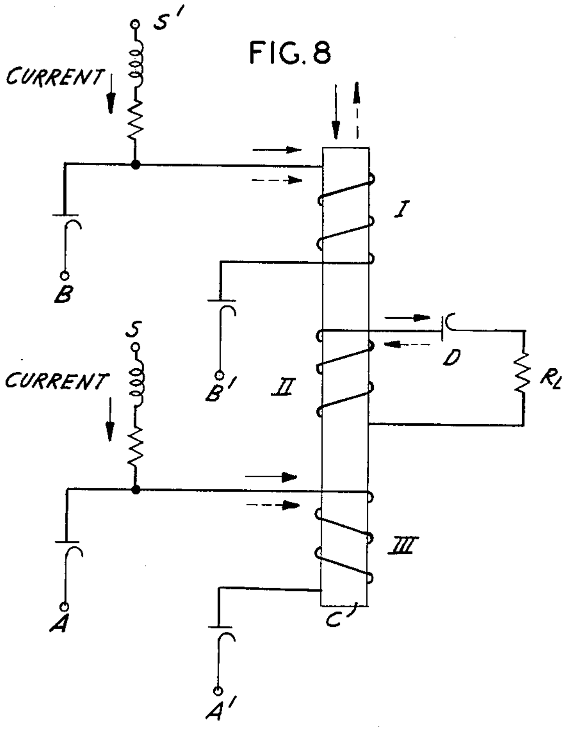
Figure 8A:
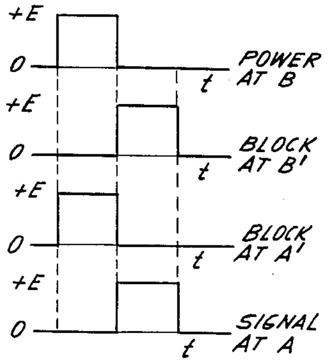
Figure 9:
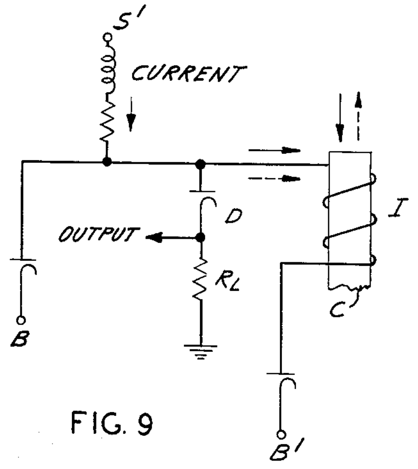
Figure 9A:
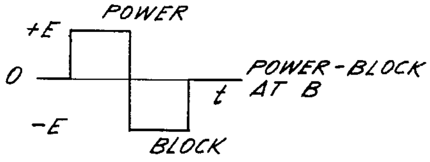
Figure 11:
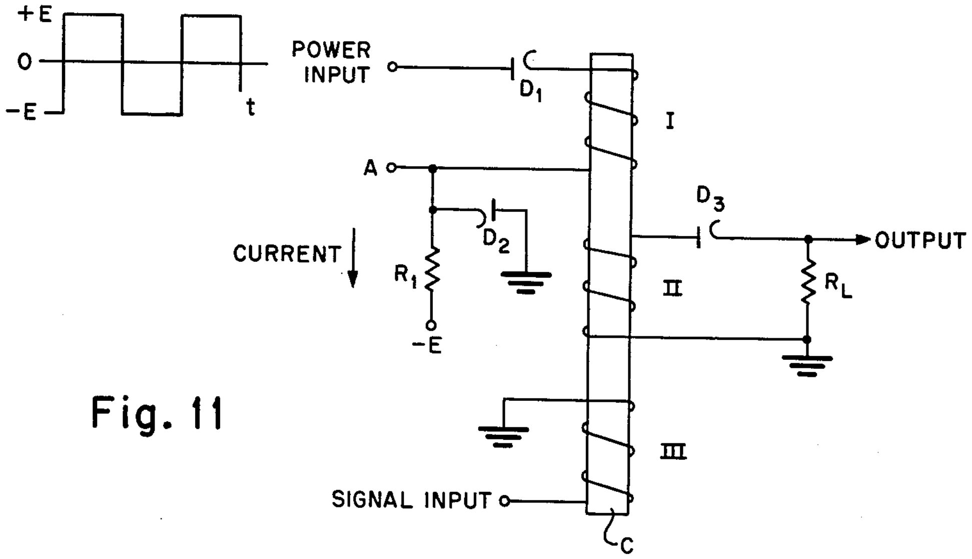

FIGURE 2*a* illustrates the operating time cycle for the embodiment of FIGURE 2;

FIGURE 3 illustrates some representative output wave forms;

FIGURE 4 shows an input winding with a constant current input;

FIGURE 5 shows an input winding with a constant voltage input;

FIGURE 6 shows an input winding to be used in connection with the application of a constant current and the use of diodes and blocking pulses;

FIGURE 6*a* represents a first operating time cycle for the circuit of FIGURE 6;

FIGURE 6*b* represents a second operating time cycle for the circuit of FIGURE 6;

FIGURE 6*c* represents a third operating time cycle for the circuit of FIGURE 6;

FIGURE 7 illustrates an input winding to be used in connection with the application of a constant voltage;

FIGURE 7*a* shows the form of pulses to be applied to the circuits of FIGURE 7;

FIGURE 8 illustrates the three windings of a magnetic signal translating device to which D.C. power may be applied;

FIGURE 8*a* shows the pulse forms to be used in connection with the arrangement of FIGURE 8;

FIGURE 9 illustrates an arrangement in which the output is directly connected to the power winding;

FIGURE 9*a* shows a wave form which serves both as a power pulse and as a blocking pulse;

FIGURE 10 exemplifies the circuits of a single coil magnetic signal translating device; and FIGURE 11 illustrates a combination magnetic amplifier.

It is to be understood that the invention is not limited to any specific geometries of the cores nor to any specific materials therefor, and that the examples given are illustrative only. The only requisite is that the material possesses a hysteresis loop preferably approaching the idealized hysteresis loop as shown in FIGURE 1.

Before describing the signal translating devices, the terms to be used in regard to different kinds of electric pulses will be defined. There are clock pulses and signal pulses. The signal pulses carry information and are, therefore, selectively applied. It depends upon the information to be transmitted whether such pulses are present or not. The clock pulses are automatically applied and do not carry any information. They may be subdivided into power pulses and blocking pulses. The power pulses usually supply the power for the operation of the signal translating device or, at least, open a gate to permit another source to operate the signal translating device. The blocking pulses block the interference of the power pulse with the signal input circuit and/or of the signal input circuit with the power circuit.

FIGURE 2 illustrates the basic arrangement of parts of a solid-state magnetic signal translating device. Part C is a core of ferromagnetic material. Winding I is the power winding, winding II is the output winding and winding III is the input winding. Power pulses are applied to winding I at, for example, terminal B. The solid arrow at terminal B indicates the direction of current of the power pulse. The solid arrow above core C indicates the direction of flux that this current causes in core C. A typical shape of the power pulse versus time is shown in the wave form of FIGURE 2*a* to the left of terminal B. This power pulse causes a curent to flow in the load resistor $R_L$ in the direction shown by the solid arrow near winding II. The power pulse also causes a current to flow in winding III in the direction of the dotted arrow shown at terminal A. When a signal pulse is applied to terminal A of the signal winding, a current is made to flow in the signal winding in the direction of the solid arrow shown near terminal A. The wave form of FIGURE 2*a* to the left of terminal A is a typical wave form which might be applied to terminal A. The vertical lines connecting the wave forms of FIGURE 2*a* indicate the time relationship between the signal input pulse, which may or may not be present at terminal A, and the power pulse which occurs at terminal B.

Figure 1:
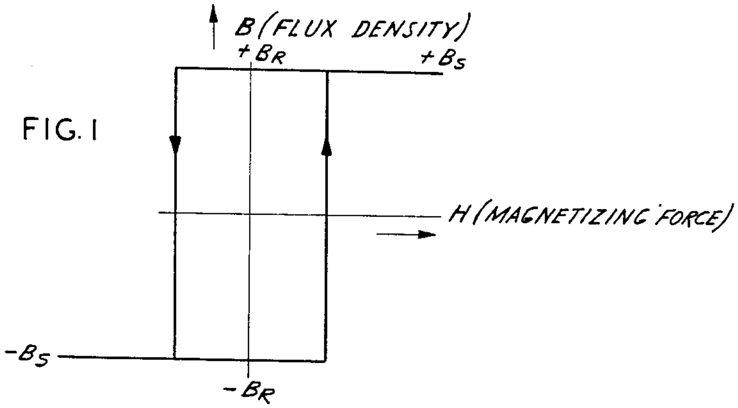
FIGURE 1 is a diagram of an idealized hysteresis loop.

The idealized BH loop of FIGURE 1 is a convenient means for describing the method of operation of the signal translating device. First, it will be assumed that there are no information pulses and that the power pulse is in such a direction as to drive core C from plus $B_R$ to plus $B_S$. In this event, there is a small flux change in the core, and hence an output voltage will be generated which, as a rule, is short in duration and, in the case of some materials, also small in amplitude (sneak pulse).

FIGURE 3 shows representative output wave forms. Wave forms X and $X^1$ are the types which would occur in the case just discussed, namely in the absence of an information pulse preceding the power pulse. The exact size and shape of these wave forms is determined by a number of factors, for example, the slope of the BH loop between $B_R$ and $B_S$, the amplitude and wave shape of the power pulse, the value of the load resistance, the power circuit inductance, eddy current phenomena in the core, distributed capacitances of the winding, etc.

Now, however, it will be assumed that an information pulse has occurred preceding the power pulse. When the preceding power pulse returned to O, it left the core in the plus $B_R$ position. The information pulse causes the material to travel from plus $B_R$ to minus $B_R$ in a counter-clockwise direction around the hysteresis loop. There is a large change of flux. Any currents which tend to flow in circuit II, the load circuit, are blocked by the diode D. Therefore, the only power which must be supplied from the information pulse is that power required to move the core from plus $B_R$ to minus $B_R$ and the power transferred to circuit I, the power circuit. Effective means have been found to block power transfer to the power circuit, as will be explained hereinafter. Therefore, the only power consumed from the signal input circuit is the power absorbed by the core in moving from plus $B_R$ to minus $B_R$ in the given time. After the period of time allotted to the signal pulse, the power pulse occurs and the core now starts from minus $B_R$ and proceeds to plus $B_R$. The core undergoes a large flux change and a large voltage is induced in winding II.

Curve Y, FIGURE 3, shows a representative output voltage versus time curve obtained when the material is operated between minus $B_R$ and plus $B_R$. The length of the output signal approximately equals the duration of the power pulse. Note that the current induced, which is in the direction of the solid arrow at winding II, FIGURE 2, is in the direction which will pass through the diode D.

The power delivered to the load may be many times larger than the power required of the information pulse. A net power gain is, therefore, obtainable in the signal translating device. Many factors influence the amount of power obtained. One of the most important factors, however, has to do with the extent to which the unwanted pulse known as the sneak pulse and shown at X or $X^1$ in FIGURE 3, may be tolerated in any practical situation. Another important factor is represented by the ratio of the slope on the steep portion of the hysteresis loop between plus $B_R$ and minus $B_R$ to the slope of the flat portion of the hysteresis loop between plus $B_R$ and plus $B_S$. A material with a rectangular hysteresis loop is desirable for this signal translating device, although by no means completely necessary.

Thus, the fundamental method of operation of this translating device has been shown. When no information pulses are applied, the material goes from plus $B_R$ to plus $B_S$ and returns to plus $B_R$; only a sneak pulse as X or $X^1$ in FIGURE 3 results across $R_L$. When a signal pulse has been received, the material moves from plus $B_R$ to minus $B_R$; an output as Y in FIGURE 3 results across $R_L$, and the material returns to plus $B_R$. Thus, the desired output signal occurs when and while the material travels within the steep middle portion of the loop where the permeability is at its greatest.

A signal translating device operating in the manner just described will be designated hereinafter as an "amplifier." It should be understood, however, that the use of the term "amplifier" is not confined to cases of actual amplification, but extended to cover all devices which produce the desired output signal in response to the application of an input signal, regardless of the fact that the power, current or voltage ratio may be greater than, equal to or less than unity. If, in contrast thereto, the desired output signal is produced in response to the non-application of an input signal, then the device will be called a "complementer."

It also should be realized that the device illustrated in FIGURE 2 as all the other devices described hereinafter operate as so-called "parallel" magnetic amplifiers or complementers. This means that the load circuit or circuits are arranged in a parallel relationship to the core when viewed from the power source, the power being supplied, in the average case, by a constant current source. The desired output signals are produced, therefore, across the load through changes in the residual flux density which, as a rule, follow the path of the hysteresis loop and keep the core within the high permeability region, i.e., between plus and minus $B_R$.

In the preferred embodiment of this invention, shown in FIGURE 11, it will be seen that, in addition to the parallel load just described, a second load is included. This second load is in series with the power pulse source, and desired output signals are produced across this load when the condition of the magnetic core in the amplifier does not substantially change in response to pulses from the power pulse source; i.e. when the core traverses its hysteresis loop in the low permeability region, as, for example, between plus flux remanence and plus flux saturation (see FIGURE 1).

In FIGURE 2, the load on circuit II is shown as a resistor. However, this might very well be any passive or active network including resistors, capacitors, inductors, any conceivable combination thereof, computing circuits, buffers, gates and other amplifiers.

In the wave forms illustrated in FIGURE 2*a*, the power pulse is shown occurring coincident with the end of the signal pulse. The time period $t_1$ marks the beginning of the signal pulse, $t_2$ marks the end of the signal pulse and the beginning of the power pulse, and $t_3$ marks the end of the power pulse. Actually, $t_1$, $t_2$ and $t_3$ mark the boundaries of the periods allotted to the signal and power pulses and by no means indicate the length of these pulses. The period $t_1$ to $t_2$ may be a relatively long time as, for example, one minute, and the actual signal pulse may have a duration of one microsecond. This one microsecond can occur at any time during the one minute period allotted to the signal. The power pulse, since it always occurs, is given a period equal to its duration. Its duration may be either greater or less than the actual duration of the signal pulse, and it may be applied at any time after the signal pulse. Therefore, this amplifier may also serve as a memory or a delay device. In view of the fact that the power pulse is derived from a source whose wave form can be accurately fixed, output pulses from this amplifier are of standard wave forms as determined by the power pulse source. This amplifier serves also, therefore, as a pulse former and pulse timing device.

In some instances, it may be desirable to obtain the amplifier information at some time which is not necessarily fixed. In this case, pulses applied to coil I may also be selectively controlled information pulses. Then the amplifier functions as a delayed gate. The information pulse applied to coil III selectively allows an output to occur when such output is selectively called for by an information pulse on coil I.

In FIGURE 2, the amplifier is shown with one signal input, one output and one power winding. Actually, a signal amplifier may have many signal input, output and power windings. Thus, it is possible for the amplifier to be operated by one of several sources and/or to operate several loads. These sources and/or loads can have different impedance and voltage levels and different polarities. The number of turns on the various windings would be adjusted to match the characteristics of the particular circuit.

Several input circuits will now be shown to handle the various problems which arise in operating this type of solid-state amplifier with both constant current and constant voltage sources. It should be stressed, in this connection, that the power pulse applied to coil I (the power winding) may, preferably, be taken from a constant current source.

A constant current source is theoretically a source of infinite impedance. A constant voltage source is theoretically a source of zero impedance. These definitions are idealized and are merely used to obtain a simplification in the analyses of circuits. From a practical point of view, the constant current source is a source whose impedance is comparatively high with respect to the load, and a constant voltage source is a source whose impedance is comparatively low with respect to the load.

FIGURE 4 represents a constant current input source which can be used with this type of amplifier. The portion of the core C shown corresponds to coil III of FIGURE 2. The directions of the currents, voltages, and fluxes shown are the same as those in FIGURE 2. Normally, when no signal is applied to terminal A, terminal A is at a small negative potential such that the potential on the plate of diode P is zero, and the current from the constant current source S flows through the diode P in series with A, and no current flows through coil III. In order to relax the tolerance requirements on this negative voltage, a diode Q may be inserted as shown in series with terminal $A^1$. If Q is present, the small negative voltage may be larger and diode Q will cut off. Reverse current will thereby be prevented from flowing in coil III. When an input is desired, a positive pulse is applied to terminal A; the diode P, in series with A, cuts off; and the current which formerly flowed through A now flows in coil III in the direction shown by the solid arrow. This princple is also applicable to the means for producing the power pulse. In this case, the actual power source would be the D.C. source of constant current and the source of switching pulses which cause this current to flow in coil III at the required time.

FIGURE 5 shows a constant voltage type of input in which the signal source S is theoretically an impedanceless source. The same portion of the core C as in FIGURE 4 is shown here. $Z_0$ is the internal impedance of a practical source and $Z_1$ is an impedance placed in series with the input coil III of the amplifier. The signal source S is selectively actuated to apply an input pulse. By placing a capacitor, shown dotted, across $Z_1$ a faster change in current can be obtained.

In the previous descriptions, both the signal and the power pulse were shown as square waves. In practice, many wave forms are possible. It is essential, however, that the signal pulse, if selectively applied, is present during the signal period. Whether or not this signal impulse may extend into a power pulse period, depends upon the characteristics of the other elements in the over-all circuit system within which this amplifier is to be used. If the time integral of the signal voltage during the signal period is equal to or greater than $2\times10^{-8}$ $B_R AN$ volts (where A is the area of the magnetic circuit in square centimeters, $B_R$ is in gauss and N the number of turns), then full output is obtained from the amplifier. If, on the other hand the time integral of the signal voltage is less than $2\times10^{-8}$ $B_R AN$ volts, an output proportionately smaller than the full output will be obtained. This effect may be used to make a lower power amplifier without decreasing the volume of magnetic material present. Therefore, it is not necessary, and indeed may not be desirable, that the amplifier operate with the full excursion between plus $B_R$ and minus $B_R$ as stated hereinabove.

One of the important problems connected with these amplifiers is the method of preventing power pulses from delivering energy to the signal input winding and the method of preventing the signal winding from delivering energy to the output winding. Several methods or combinations of methods can be used. One simple case occurs when the power winding is connected to a high impedance source. In this case, the high impedance itself prevents energy transfer from the signal to the power winding. Various combinations of diodes and blocking voltages can also be used on both signal and power windings.

FIGURE 6 is an example of how diodes and blocking pulses can be used to isolate the power winding from the input or the input from the power winding, whenever a constant current source is used for the input winding. (In the case of coil I (the power winding), the application of a constant current source may be regarded as a rule.) The portion of core C containing the input winding as in FIGURE 2 is redrawn in FIGURE 6. A similar arrangement may be used for the power circuit, but the diode corresponding to diode P would not be necessary in such a case, provided that the point corresponding to point S is connected to a device which prevents any back flow of current. The wave forms applied in one method of using this principle are shown in FIGURE 6*a*. The pulse applied to the power winding is shown. At the same time, a positive pulse is applied to point $A^1$ from a blocking source. This cuts off the diode Q in series with $A^1$ and prevents flow of current which, as a result of transformer action, would try to flow as shown by the dotted arrow. The blocking pulse has the same or greater duration as the power pulse and sufficient amplitude to prevent the flow of current. At some later time, as previously described, a signal pulse is applied to point A. FIGURE 6*b* shows an alternate method for accomplishing this result. Here the blocking pulse is applied to the point A and the signal to point $A^1$. In this case, the polarities of both the blocking pulse and the signal are negative.

Another method for accomplishing the same thing is shown in FIGURE 6*c*. The power pulse is the same as previously described. Now, however, a wave form as shown in the second line is applied to terminal S. This wave form is called the block and signal supply because it is of the correct polarity to block during the power pulse period, and it can supply power to the signal winding in the event that a wave form, as shown in the last line, appears at point A. Point $A^1$ would be grounded in this case, and diode P may be eliminated.

FIGURE 7 shows a method of isolating the power pulse from the input when using a constant voltage source. Here again only coil III and part of core C, as in FIGURE 2, are shown. A power pulse is applied as shown in FIGURE 7*a*. During the period of the power pulse, a blocking voltage from a low impedance source is applied at point $A^1$. This acts to cut off the diode P in series with terminal A and prevents current from flowing in the direction of the dotted arrow. This is the direction in which the power pulse would tend to make the current flow. A signal pulse as shown in the bottom wave form of FIGURE 7*a* is selectively applied at point A.

FIGURE 8 shows both D.C. power sources and blocking pulses which can be used on both power and signal windings in an amplifier. A power pulse is applied as shown at point B and the constant current from $S^1$, which normally would flow to B, is made to flow through coil I. Similarly, a blocking voltage is applied at point $A^1$. During the signal period, a positive signal pulse is applied to terminal A and the current from S, which normally would flow through A, is made to flow through coil III. A positive blocking voltage is applied at point $B^1$. Note that if a signal pulse does not occur, the block is applied anyhow so that the signal source does not have to supply power required to block. The application of the block in no way harms the operation of the amplifier.

In the preliminary description of the operation of the amplifier, the output winding was shown as a separate winding II of FIGURE 2 and other figures. However, it is not necessary that this be so. The output may be connected as shown in FIGURE 9, i.e., across the power winding I with the diode D in series with the load $R_L$. The input and output wave forms are the same as shown before. The previously discussed principles, for example, those of FIGURE 8, can be still applied to this circuit. A block such as applied at $B^1$, FIGURE 8, can also be applied at $B^1$, FIGURE 9. A power pulse can be applied at B, FIGURE 9, or if terminal B is eliminated, it can be applied at point $S^1$, as described in connection with FIGURE 6*c*. The power pulse applied at B may also serve as a blocking pulse if it is allowed to go negative, as shown in FIGURE 9*a*. In this case point $B^1$ would be grounded.

A magnetic amplifier may be constructed having only one coil on a core of ferromagnetic material. An example of a single coil magnetic amplifier is shown in FIGURE 10. This amplifier has a constant current applied via resistor $R_S$. During the power period, when the power input has a positive pulse applied thereto, diode $D_1$ cuts off and current flows through resistor $R_S$, the amplifier coil and diode $D_5$, in series, and through diode $D_4$ and the load resistor $R_L$. Assuming that there has been no signal input, the core will be at plus $B_R$ flux density, when the power pulse arrives, and will travel from plus $B_R$ to plus $B_S$, and there will be only a small voltage across $R_L$, and only a sneak output pulse will result.

During the signal input period, a negative pulse is applied to the power input. Diode $D_1$ will connect, and point A will be at the potential of the negative pulse applied to the power input. Diodes $D_4$ and $D_5$ will disconnect, and no current will flow through the amplifier coil. If a signal input is applied at this time through capacitor F, diode $D_3$ will connect, and a current will flow through the amplifier coil in the reverse direction, driving the core from plus $B_R$ flux density to minus $B_R$ flux density. Then, during the next power pulse, the core will travel from minus $B_R$ to plus $B_R$ and a large output will result.

A voltage gain may be obtained from this amplifier by connecting diode $D_3$ to point B instead of point X as shown. In this case it will require less voltage (although more current) to reset the amplifier from plus $B_R$ to minus $B_R$.

Referring now to FIGURE 11, there is shown in its preferred form the combination magnetic amplifier which, in many respects, is similar to the three-winding amplifiers shown and described in connection with FIGURES 2 and 8. As before (e.g. FIGURE 5), the positive portion of the power pulse is applied from a constant voltage source via a diode $D_1$ to a power pulse winding I wrapped about the core C of the magnetic amplifier. The current produced by the power pulse through winding I generates a flux which drives the core to one state of saturation (e.g. $+B_S$). Signal inputs are applied to winding III, and these signals produce a current and a resultant flux tending to drive the core to another state of saturation (e.g. $-B_S$, see FIGURE 1). It will be appreciated from the foregoing discussion that for optimum operation the signal inputs are applied when the current (due to the power pulse) is not flowing through the power pulse winding I.

A load winding II is shown wrapped about core C and this winding II is connected in parallel to load resistor $R_L$ (hereinafter called the parallel load) through diode $D_3$. So far, as has been described, with the one load element $R_L$ this amplifier is essentially the same as the three-winding amplifiers already described. However, this combination amplifier comprises a second load $R_1$ (hereinafter called the series load) which is connected from a source of voltage $-E$ to the source of power pulses via the series circuit comprising winding I and diode $D_1$. A clamping diode $D_2$ is connected at its cathode to the juncture, point A, of series load $R_1$ and power pulse winding I. The anode of clamping diode $D_1$ is connected to ground potential.

In addition to serving as a series load, resistor $R_1$ in combination with diode $D_2$ performs another function which shall be described in detail later. Suffice it to say for the present that the resistor $R_1$ and diode $D_2$ prevent overloading of the power pulse winding and power pulse source and tend to keep the output pulse, developed across the parallel load $R_L$, constant in amplitude and duration.

In operation, if the core C of the combination amplifier is at $-B_R$ of its hysteresis loop (see FIGURE 1) when the positive portion of the power pulse is applied, the full power pulse voltage will appear across the power winding I as the core traverses its hysteresis loop from $-B_R$ to $+B_R$. As the core C traverses its hysteresis loop from $-B_R$ to $+B_R$, a flux is generated which produces a voltage across load winding II, and an output will appear across parallel load $R_L$ synchronously with the application of the positive portion of the power pulse. This output will be constant in duration and amplitude, as shall now be explained. An examination of FIGURE 11 will show that in the absence of a positive voltage applied to the anode of diode $D_1$ a constant current will flow from voltage source $-E$ through series load resistor $R_1$ and didode $D_2$ to ground potential whereby the point A is substantially clamped at ground. When the positive portion of the power pulse is applied to the anode of diode $D_1$ and current from the power pulse source equals the current flowing through series load $R_1$, the diode $D_2$ will break free and the lower end of power pulse winding I will look into the high impedance of series load resistor $R_1$. The current from the power pulse will thus be limited to the value of the latter current $$\left(\frac{-E}{R_1}\right)$$

and there is no danger of overloading the power pulse winding or the power pulse source. In essence, the addition of series load resistor $R_1$ serves to make any power pulse source connected to power pulse winding I a source which produces a constant current, as determined by the current normally flowing through resistor $R_1$. Since the current from the power pulse source is already determined by the value of load resistor $R_1$, it will be understood that changes in the value of the parallel load resistor will not affect the amplitude or duration of the output produced across this parallel load.

If the core is at $+B_R$ (FIGURE 1) when the power pulse is applied, no voltage will appear across the power pulse winding I and consequently there will be no output developed across the parallel load $R_L$. The current from the power pulse source will immediately reach the value of the current flowing through series load resistor $R_1$ and the full value of the power pulse voltage will appear at point A.

As stated, the application of a signal to winding III will cause the core C to be driven to minus flux saturation, $-B_S$. After the removal of the signal, it will be appreciated that the core C will relax and assume an operating position on its hysteresis loop of the minus flux remanence, $-B_R$, (see FIGURE 1). Thus, when the power pulse is applied, the core will be driven from minus flux remanence, $-B_R$, to plus flux remanence, $+B_R$, with an output appearing across the parallel load resistor $R_L$, provided a signal has been previously applied to winding III. If no signal had been previously applied to winding III, the core C would be at plus flux remanence, $+B_R$, as a result of the last applied power pulse; any additional power pulses applied to winding I would only tend to drive the core C from that operating point to plus flux saturation, $+B_S$. As a result, no substantial output can be developed across the parallel load resistor $R_L$ although, as explained, an output would be developed across the series load resistor $R_1$.

This circuit may, therefore, serve as both an amplifier and a complementer, the amplifier output being taken across parallel load $R_L$ and the complementer output being taken across series load $R_1$.

Although the combination magnetic amplifier has been shown as comprising three separate windings, it will be appreciated by those skilled in the art that the one-winding magnetic amplifier of FIGURE 10 or the two-winding magnetic amplifier of FIGURE 9 may readily be converted to a combination type magnetic amplifier by connecting a load resistor in series with the power pulse winding I of those respective amplifiers.

Having thus described our invention, we claim:

1. The combination comprising a magnetic core exhibiting two states of magnetic remanence, a coil means coupled to said core, said coil means having terminals to receive first electric pulses tending to drive said core to a first state of remanence and to receive second electric pulses tending to drive said core to a second state of remanence, a first load means connected in series with a portion of said coil means and said terminal which receives said first electric pulses, and a second load means coupled in parallel to a portion of said coil means, said first electric pulses being produced across said first or second load means depending upon whether said second electric pulses are received.

2. The combination comprising a magnetic core exhibiting two states of magnetic remanence, a coil means coupled to said core, said coil means having a first terminal to receive first electric pulses tending to drive said core to a first state of remanence and another terminal to receive second electric pulses tending to drive said core to a second state of remanence, said coil means coacting with said magnetic core as to offer a high impedance to said first electric pulses when said core is in a first state of remanence and a low impedance to said first electric pulses when said core is in a second state of remanence, a first load means connected in series with a portion of said coil means and said first terminal, and a second load means connected in parallel to a portion of said coil means, said first electric pulses being produced across said first or second load means depending upon whether said second electric pulses are received.

3. The combination comprising a magnetic core exhibiting two states of magnetic remanence, a coil means coupled to said core, a first source of electric pulses coupled to said coil means for driving said core to a first state of magnetic remanence, a second source of electric pulses coupled to said coil means for driving said core into a second state of remanence, a first load means connected in series with a portion of said coil means and said first source of electric pulses, and a second load means connected in parallel to a portion of said coil means, said first electric pulses being produced across said first or second load means depending upon the application of electric pulses from said second source to said coil means.

4. The combination defined in claim 3 wherein said electric pulses from said first source tend to drive said core to a first state of magnetic remanence and said electric pulses from said second source tend to drive said core to a second state of magnetic remanence.

5. The apparatus defined in claim 4 wherein said pulses from said first source are applied periodically and said pulses from said second source are selectively applied in the periods when pulses from said first source are not present.

6. The apparatus defined in claim 4 wherein said first source produces pulses of first and second polarities, said first source includes a rectifying element connecting said first source to said coil means, and said pulses from said second source are selectively applied during the time the pulses from said first source are of said first polarity, the pulses from said first source of said one polarity rendering a portion of said coil means inoperative and the pulses from said first source of said second polarity causing an electric current to flow through said coil means.

7. The combination comprising a magnetic core exhibiting two states of magnetic remanence, a coil means coupled to said core, a first source of electric pulses coupled to said coil means for driving said core to a first state of magnetic remanence, a second source of electric pulses coupled to said coil means for driving said core into a second state of remanence, a first load means connected in series with one portion of said coil means and said first source of electric pulses, and a second load means connected in parallel to another portion of said coil means, said first electric pulses being produced across said first or second load means depending upon the application of electric pulses from said second source to said coil means.

8. The combination defined in claim 7 further comprising a ground reference potential, a unilateral conductor, and a source of constant potential wherein said source of constant potential is connected through said first load means to said coil means and said unilateral conductor is interposed between the junction of said first load means and said coil means and said reference potential.

9. The combination defined in claim 8 wherein said unilateral conductor is poled so that current flows through said unilateral conductor from ground potential through said first load means to said source of constant potential.

10. The combination defined in claim 8 wherein said source of constant potential is negative in polarity, the electric pulses from said first source are positive in polarity, and the absolute value of the positive and negative polarities from said source of constant potential and said first source are substantially equal.

11. A combination comprising a core of magnetic material having the property of high remanence flux relative to its saturation flux, a first, second and third electric winding associated with said core, a source of power pulses coupled to one end of said first winding, a first load element having a plurality of terminals, connected at one of said terminals to the other end of said first winding, a second load element connected in parallel with said second winding, and a source of signal pulses connected to said third winding said power pulses being produced across said first or second load means depending upon the application of signal pulses from said source of signal pulses to said third winding.

12. The combination defined in claim 11 further comprising a source of constant potential connected to another terminal of said first load element, a ground reference potential, and a first unilateral conductor connected between said ground reference potential and said one terminal of said load element.

13. The combination defined in claim 12 wherein said source of power pulses is a constant voltage source and further including a second unilateral conductor interposed between said second winding and said second load element, and a third unilateral conductor interposed between said source of power pulses and said first winding.

14. The combination defined in claim 12 wherein said source of constant potential is negative in polarity, the electric pulses from said first source are positive in polarity, and the absolute value of the positive and negative polarities from said source of constant potential and said first source are substantially equal.

15. A magnetic switch circuit comprising in combination: a magnetic device having a control circuit, an input circuit, and a first and second output circuit and capable of providing controllable series impedance from said input circuit to said first output circuit and controllable inductive coupling from said input circuit to said second output circuit, said series impedance and said inductive coupling being controllable and responsive to a control signal applied to said control circuit; means to apply current energy to said input circuit; means to apply a control signal to said control circuit to control the distribution of said current energy between said first and second output loads.

References Cited in the file of this patent

UNITED STATES PATENTS

| | | |
|---|---|---|
| 2,614,167 | Kamm | Oct. 14, 1952 |
| 2,722,603 | Dimond | Nov. 1 1955 |
| 2,808,578 | Goodell | Oct. 1, 1957 |
| 2,822,480 | Isborn | Feb. 4, 1958 |